June 15, 1965  J. W. BUTLER  3,188,785
VACUUM COLD TRAP
Filed April 29, 1960  3 Sheets-Sheet 3
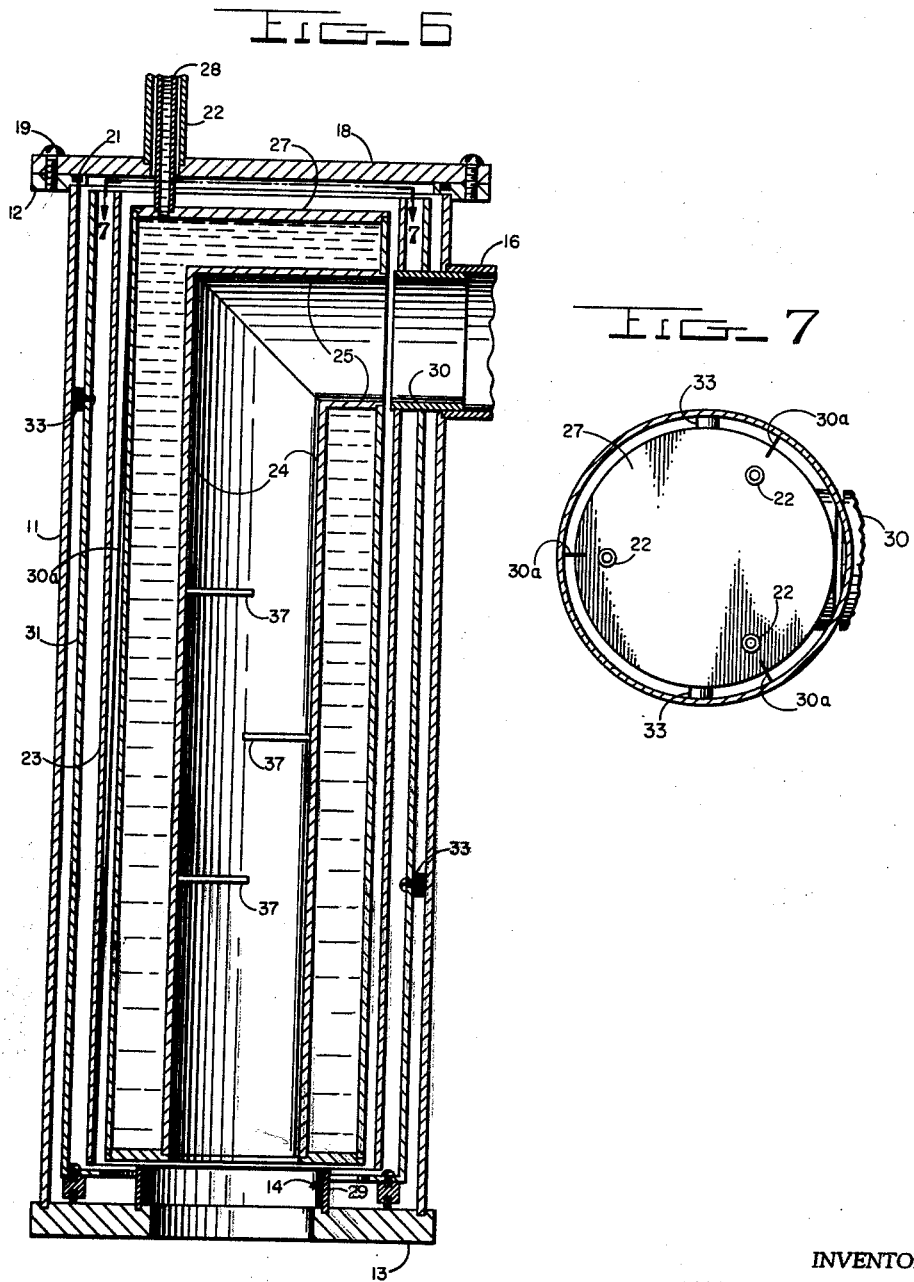
INVENTOR
JAMES W. BUTLER

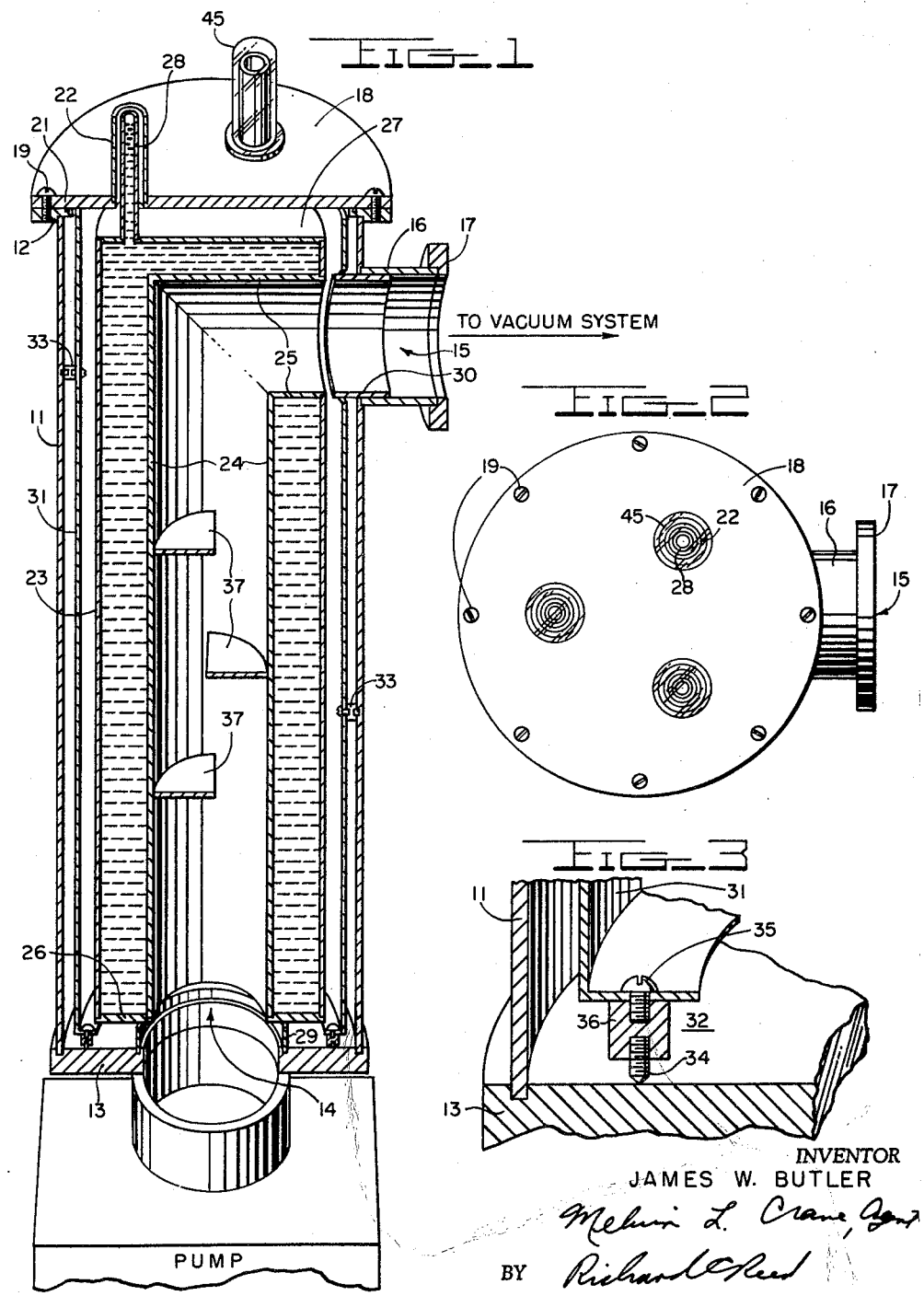

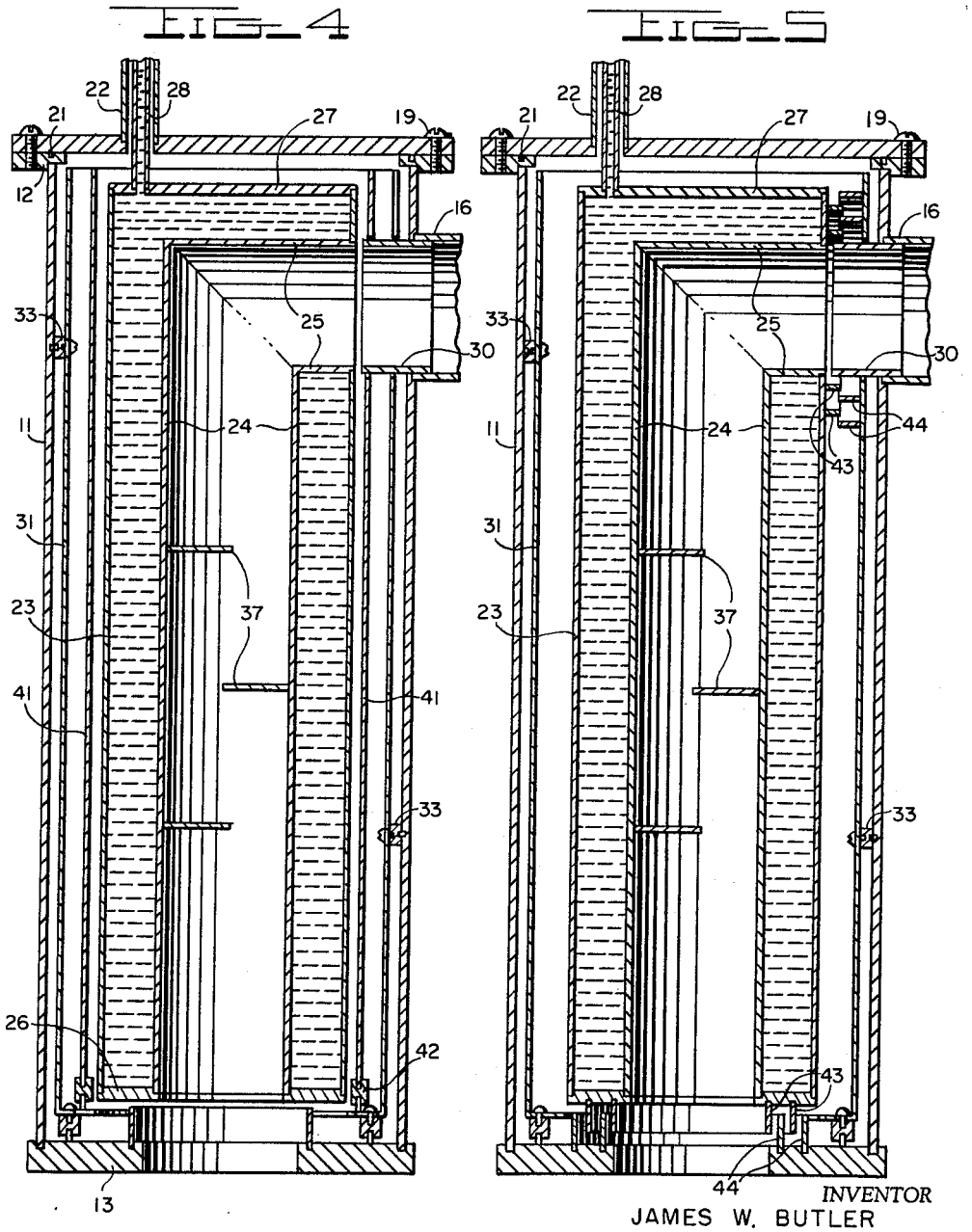

3,188,785
VACUUM COLD TRAP
James W. Butler, 201 Elmira St. SW.,
Washington 24, D.C.
Filed Apr. 29, 1960, Ser. No. 25,802
13 Claims. (Cl. 55—269)
(Granted under Title 35, U.S. Code (1952), sec. 266)

The invention described herein may be manufactured and used by or for the Government of the United States of America for governmental purposes without the payment of any royalties thereon or therefor.

The present invention relates to vacuum cold traps and more particularly to a high efficiency, long-lived vacuum cold trap.

In the use of vacuum systems for many purposes, it is necessary that the vacuum system be essentially free of any contaminant residue or vapors, otherwise the system and/or device contained inside the system will become contaminated. It is known that when using diffusion pumps, etc., pump fluid vapors will migrate into the system and create problems in those instances where clean vacuum systems are needed. Heretofore, prior art devices have made use of fairly simple, cold fingers protruding into a pumping tube. The fingers are filled with a coolant such as liquid nitrogen or a Dry-Ice-acetone mixture and any molecules striking the cooled surface usually will be captured by the surface. In these devices, the cold fingers face relatively hot outside surfaces and the coolant evaporates very fast; therefore, the devices become very expensive to operate and are very inconvenient since the coolant must be replaced every few hours. Also the cold finger protruding into the pumping path does not extend across the entire opening of the pumping path; therefore, molecules migrate past the cold finger without colliding therewith. Thus, only a portion of the contaminants are collected by the cold finger or cold surface.

It is therefore an object of the present invention to provide an efficient, economical, and convenient apparatus for collecting undesired molecules migrating into a vacuum system.

Another object is to provide an apparatus which has long life, high pumping speed, and very high trapping efficiency.

Still another object is to provide a vacuum cold trap which has minimum conduction heat transfer and long lasting coolant.

Yet another object is to provide an apparatus for removing oil and other condensable vapors from a vacuum system.

While another object is to provide a vacuum cold trap which takes advantage of the vacuum system to form the coolant reserve storage chamber.

Other and more specific objects of this invention will become apparent upon a more careful consideration of the following detailed description when taken together with the accompanying drawings, in which:

FIG. 1 is a sectional perspective view of the apparatus of the present invention;

FIG. 2 is a top view of the apparatus shown by illustration in FIG. 1;

FIG. 3 illustrates an enlarged view of a radiation shield support;

FIGS. 4 and 5 are modifications of the apparatus shown in FIG. 1;

FIG. 6 is a modification of the apparatus shown in FIG. 4; and

FIG. 7 is a sectional view taken along line 7—7 to illustrate the features of the device.

The present invention is directed to an apparatus for trapping oil, condensable vapors, or other contaminants in a vacuum system. The apparatus makes use of a cold surface in a vacuum system over which the evacuating gases diffuse toward a pumping mechanism. Molecular oil vapors, etc., collide with th cold surface and lose their energy so that the vapors condense onto the cold surface. The apparatus of the present invention is constructed such that any migrating molecule must collide with at least one cold surface which is sufficient in most cases to trap or capture the molecule.

The apparatus comprises a housing having an inlet and an outlet with a reservoir positioned therein with a passage through the reservoir that aligns with the inlet and outlet of the housing. The reservoir is formed between two surfaces joined together such that a coolant in the reservoir surrounds the passage therethrough, and is supported from the top plate of the housing by very thin re-entrant tubes. The housing is sufficiently larger than the reservoir to provide a space between the housing wall and the reservoir wherein the spacing therebetween is evacuated by the system in which the cold trap is positioned to form an arrangement similar to a vacuum bottle. Thus the coolant in the reservoir will be protected from thermal conductivity by the vacuum region between the reservoir and the housing. Further thermal protection is obtained by inserting a radiation shield or shields between the reservoir and the housing wall.

Now referring to the drawing, there is shown by illustration in FIG. 1, a cross-sectional view in perspective of a suitable vacuum cold trap made in accordance with the present invention. The device includes an outer chamber or housing 11 of cylindrical form which has a flange 12 welded, soldered, or brazed at the top thereof and a bottom plate 13 welded, soldered, or brazed thereto at the bottom thereof. The bottom plate extends beyond the cylinder 11 to form a flange by which the cold trap can be connected in a vacuum system to a pumping mechanism. The bottom plate has a hole therethrough which forms an outlet 14 for the housing. An inlet 15 is provided near the top of the housing by an annular member 16 welded to the housing and is provided with a flange 17 by which the cold trap can be connected into a system for evacuating that system. The housing is provided with a top plate 18 which is secured to the flange on the cylinder by screws 19 and is provided with an "O" ring 21 therebetween to prevent any leakage between the top plate and the flange on the cylinder. The top plate is provided with three holes in a triangular arrangement to which a stand pipe or tube 22 is welded to each hole.

A reservoir adapted to be positioned in the housing with a space therebetween comprises an outer cylindrical member 23, an inner tubular member having a portion 24 coaxial with the cylindrical member and a portion 25 at right angles thereto with the outer end of the portion 25 welded, soldered, or brazed to the wall of the cylindrical member near the top thereof. A lower plate 26 is welded to the lower end of the cylindrical member and the lower end of the portion 24 coaxial therewith, and a top plate 27 is welded to the cylindrical member at the top thereof. The top plate has three holes therein arranged in a triangular configuration such that the spacing of the holes are the same as the spacing of the holes in the top plate of the housing and will align therewith. A tube or pipe 28 of smaller diameter than standpipes 22 is welded, soldered, or brazed to each of the holes in the upper plate 27 of the reservoir and then welded at the other end to the outer end of the standpipes 22 in the top plate 18 of the housing to support the reservoir from the top plate 18 of the housing. The pipes 28 are made of thin material and are of a length such that a space exists between the top plate 18 of the housing and the top plate 27 of the reservoir and the reservoir is supported such that the passage through the reservoir formed by the inner tubular member 24, 25 aligns with the inlet and outlet of the housing and provides a passageway through the reservoir. The reservoir is also supported in such a manner that there is a space in the housing that completely surrounds the reservoir on all sides. The only contact the reservoir has with the housing is the weld joints between the standpipes 21 and the tubes 28. Tubes 28 also provide a means through which a fluid may enter into the reservoir and are known as filler tubes.

Since there is a spacing between the inner surfaces of the housing and all outer surfaces of the reservoir, the spacing about the reservoir will be evacuated by the vacuum pumps to which the cold trap is connected. This arrangement provides effectively a cold trap as a "vacuum bottle" formed by the evacuating system in which the cold trap is secured.

In order to insure that essentially none of the contaminants in the evacuating system migrates between the reservoir and the inner surface of the outer chamber, a cylindrical baffle 29 is placed between the bottom plate 13 secured to the housing and the bottom plate 26 secured to the reservoir and positioned near the outlet 14 such that the baffle extends from the bottom plate 13 toward the bottom plate 26 but does not contact the bottom plate. Since the baffle does not extend completely to the bottom plate of the reservoir, a space is left therebetween to permit fluid flow from between the housing and the reservoir. A baffle 30 is positioned at the inlet of the cold trap between the housing and the reservoir to prevent any molecular flow into the void between the housing and the reservoir near the inlet 15.

Thermal conductivity of the static residual gas in the vacuum region between the reservoir and the housing is negligible; however, there exists a radiation heat transfer between the wall of the housing and the outer wall surface of the reservoir which is of great concern. To counteract the heat transfer between the housing and the outer wall of the reservoir, a radiation shield 31 is inserted in the spacing between the reservoir and the housing wall. To reduce the heat transfer to a minimum, the radiation shield is supported at the bottom by only two supports 32 and by two supports 33 on the sides. Each of the bottom and side supports 32 and 33 (as shown by an enlarged view in FIG. 3) comprises a sharp pointed screw 34 which contacts the housing, a screw 35 which holds the support to the radiation shield and a porcelain bushing 36 separating the two screws. The porcelain bushing provides thermal insulation between the radiation shield 31 and the sharp pointed screw, whereas the sharp pointed screw provides a "pinpoint" contact between the radiation shield and housing to reduce further any conduction heat transfer. The bottom and side supports lie in vertical planes in which the sharp pointed screws on the side extend in directions perpendicular to the screws on the bottom in order to stabilize the radiation shield within the housing. However, the bottom and side supports are each shown in the drawing for illustrative purposes only and not in their true positions relative to each other. Thus, the radiation shield is practically entirely thermally insulated and assumes some intermediate temperature between the housing and the outer wall of the reservoir to reduce the radiation heat transfer to the reservoir.

The passage through the reservoir has a 90-degree turn and therefore provides at least one cold surface which any molecule will strike on trying to pass through the cold trap. However, to insure that any condensable molecules entering the cold trap do not pass therethrough, three somewhat semicircular baffles 37 are secured in the passage through the reservoir. The baffles extend across the passage slightly beyond the axis such that any particles passing through the passage must strike at least one of the baffles which are maintained at a cold temperature by the reservoir.

FIG. 2 is a top view of the cold trap which illustrates the arrangement of the filler tubes 28, the annular member 16, the flange 17 and the screws 19 which secure the top plate 18 to the housing cylinder 11.

In order to cut down further on the radiation heat transfer between the housing and the reservoir, a second radiation shield 41 as shown by FIG. 4 can be inserted into the spacing between the housing and the reservoir. The second radiation shield is inserted between the radiation shield 31 and the reservoir and can be supported by the radiation shield 31 by supports 42 or it can be held in position by any suitable means such as by three thin wires 30a connected to the bottom of the radiation shield 41 and at the top of the outer wall surface of the reservoir as shown by illustration in FIGS. 6 and 7. The supports will permit very little conduction heat transfer between the reservoir and the first radiation shield 31, and the second radiation shield 41 will further aid in preventing radiation transfer of heat across the vacuum space in the housing. The radiation shield 41 will also include side supports 33 positioned in appropriate places to prevent the shield from touching either the reservoir wall or the radiation shield 31.

FIG. 5 is a further modification which illustrates a vacuum cold trap as shown in FIG. 1 which includes additional baffles between the housing and the reservoir at the inlet and outlet of the cold trap. As shown, the reservoir outer wall has baffles 43 secured thereto which interleave with additional baffles 44 secured to the inner surface of the housing. These additional baffles further restrict any flow of condensable molecules between the housing and the reservoir at the inlet and outlet. The additional baffles insures that any molecules entering the void between the outer housing and inner reservoir must enter the passages between the interleaved baffles where condensable vapors will be trapped. Since there is a spacing between the reservoir and the housing and the baffles interleave to provide spaces therebetween, there is still sufficient passageway for any fluid to be evacuated from the spacing between the reservoir and the housing.

Further reduction in radiation heat transfer across the evacuated area between the reservoir and the housing can be carried out by plating appropriate surfaces with gold or silver. These surfaces include the inner wall of the housing, each surface of the inner radiation shield or shields, the outer surfaces of the reservoir and the inner surface of the top and bottom plate of the housing. The gold or silver can be plated onto the surfaces by any well known process which is not a part of the present invention.

The vacuum cold trap shown is illustrative and can be made with a larger passage for faster pumping as well as with a larger reservoir. Also, it is obvious that the cold trap can be made larger and shorter or into a square device rather than as a cylindrical device as shown. As shown the housing, the reservoir, radiation shields, and filler tubes are made of stainless steel. The outer wall of the reservoir is made as thin as possible to provide a low heat capacity. The filler tubes have a thickness of 0.006 in., the outer tubular member of the reservoir has a thickness of about 0.016 in., the inner tubular member of the reservoir has a thickness of about 0.125 inch, the upper and lower end plates of the reservoir have a thickness of about 0.225 in. because flat surfaces are under a greater strain than cylindrical surfaces under pressure differentials. The device as shown has a passage with a diameter of about four inches through the reservoir and the reservoir has a capacity of about sixteen liters of liquid nitrogen and when filled, will last for about five days operation with clean trap surfaces and for about three days with dirty trap surfaces which occurs after about one year of operation.

In operation of the device, the device is assembled with the reservoir and radiation shields placed into the housing through the top and the top plate of the housing is secured to the housing body. The cold trap is connected in the system with the flange of the inlet connected to a line in the system to be evacuated. The outlet end is connected in the pumping line of the system such that the fluid evacuated from the vacuum system passes through the cold trap before passing to the pumps. When the trap has been connected in the system, the evacuating pumps are run for a period of time before filling the reservoir. The reservoir is then filled with liquid nitrogen or some other suitable coolant and the vacuum cold trap is in operation. The cold traps oil and contaminants at the inlet from the vacuum system seals, lines, etc., and any oil vapors, etc., that enter the outlet from the diffusion pumps. Any molecules of oil vapor entering the outlet are trapped by the walls of the cold passage and any molecules not hitting the cold wall surface passes on up the passage and will strike one of the baffles. Upon striking the cold inner surface or baffle the molecules lose part of their energy and stick to the surface. It has been determined that a vacuum cold trap as shown, can be run continuously for about one year before it is necessary to clean the inner surface. Upon cleaning the device, there is evidence of oil trapped about the inlet and outlet at the reservoir and on the surface of the two lower baffle plates facing the pumps. When the reservoir is removed for cleaning it is always best to have some coolant remaining in the reservoir so that the contaminants will remain on the surface. If the reservoir is permitted to warm-up, the molecules could migrate from the surface and consequently they might return to the pumping system or evacuated system. Cleaning is done with standard cleaning solutions such as trichloroethylene, acetone, and ethyl alcohol.

After cleaning, reinserting, and securing the reservoir into the housing body, it is desirable that the inner surface of the housing body be purged of any residue from the cleaning process. The device is purged by starting the vacuum pumps and running them for a period of time while maintaining the housing body at a temperature of about 60 degrees C. or higher. The flanges on each end are not heated quite so hot on account of the O ring seals, however the housing body can be heated very close to the flanges due to the low heat conductivity of the stainless steel wall without actually raising the flange temperature very much.

The filler tubes at the top are covered by inverted beakers or any other suitable covering 45 placed over the tubes. The beakers must be large enough that they do not touch the filler tube and also long enough that it will rest on the upper plate of the housing. The beakers minimize heat transfer from the air and also prevent frost from forming at the top of the tubes. If the beakers are coated with a high infra-red reflecting layer of gold or silver (or even aluminum), they will be somewhat more effective.

It is seen that trapping action by the present system is limited to the interior surfaces of the cold trap, since the pumping action through the trap is through the innermost tube which is completely surrounded by the coolant. Thus the foreign matter that is trapped coats the inner surfaces and therefore does not materially affect the radiation heat transfer to the trapping surfaces, because the "dirty" surfaces see another surface at the same temperature, thus involving no heat transfer. Trapping action on the outside of the reservoir is limited by the baffles at the inlet and outlet because these baffles direct any contaminant on into the interior passage through the reservoir. There is essentially no conduction heat transfer between the reservoir and the baffles at the inlet and outlet since they do not touch; and furthermore since they do not touch, the vacuum pumps will evacuate the spacing between the reservoir and the housing.

It is known that liquid nitrogen can be delivered in fifteen liter delivery flasks; therefore, if the cold trap reservoir is filled with liquid nitrogen, the reservoir should be filled when about one-fifteenth of the liquid remains in the reservoir then the reservoir is filled without wasting any liquid. It is not necessary that liquid nitrogen be used since it will be obvious to others that other coolants can be used. Such other coolants may be solid carbon dioxide, a mixture of solid carbon dioxide and acetone, or even a recycling refrigerant in which the cold trap could be the evaporator part of the system.

Obviously many modifications and variations of the present invention are possible in the light of the above teachings. It is therefore to be understood that within the scope of the appended claims the invention may be practiced otherwise than as specifically described.

What is claimed is:

1. A vacuum cold trap adapted to be connected in a vacuum pump system which comprises a housing comprising top and bottom plates, standpipes connected with said top plate and extending outwardly therefrom, an inlet and an outlet in said housing, a reservoir adapted to contain a coolant therein, said reservoir comprising three filler tubes connected to the top thereof, said filler tubes connected to the standpipes connected with the top plate of said housing to suspend said reservoir within said housing in a spaced relationship on all sides, a passage through said reservoir forming a cold trap surface with at least two cold collision surfaces, said cold trap surface being surrounded entirely by the space in said reservoir, said passage aligning with said inlet and said outlet in said housing, and at least one baffle secured at said inlet and said outlet and spaced from said reservoir.

2. A vacuum cold trap as claimed in claim 1, wherein said cold trap surface comprises at least three cold collision surfaces.

3. A vacuum cold trap as claimed in claim 1 wherein said spacing between said reservoir and said housing surrounds said reservoir and may be evacuated by said vacuum pump system.

4. A vacuum cold trap as claimed in claim 3 wherein a radiation shield is secured in said spacing between said reservoir and said housing.

5. A vacuum cold trap as claimed in claim 4, wherein said radiation shield is secured in said spacing by thermally insulated sharp pointed protrusions secured at the bottom and sides thereof.

6. A vacuum cold trap as claimed in claim 5 wherein opposing surfaces of said housing, said radiation shield, and said reservoir are coated with an infra-red reflective coating.

7. A vacuum cold trap as claimed in claim 4 wherein two radiation shields are secured in said spacing between said reservoir and said housing.

8. A vacuum cold trap as claimed in claim 7 wherein opposing surfaces of said housing, said radiation shields, and said reservoir are coated with an infra-red reflective coating.

9. A vacuum cold trap adapted to be connected in a vacuum pump system which comprises a housing comprising a cylindrical body, a removable top, equally spaced standpipes connected with said removable top, a bottom plate, an outlet in said bottom plate and an inlet in said cylindrical body near the top thereof, a reservoir adapted to contain a coolant therein, said reservoir comprising three filler tubes connected thereto at the top thereof, said filler tubes secured to the equally spaced standpipes connected with said removable top of said housing to suspend said reservoir in said housing in a spaced relationship on all sides, a passage through said reservoir forming a cold trap surface with at least two cold collision surfaces, said cold trap surface being surrounded entirely by the space in said reservoir, said passage through said reservoir aligning with said inlet and said outlet in said housing, at least one baffle secured to said housing at said inlet and said outlet and spaced from said reservoir.

10. A vacuum cold trap as claimed in claim 9 which comprises at least one radiation shield in said housing positioned between said cylindrical body and said reservoir in said housing without said radiation shield touching said reservoir and said housing.

11. A vacuum cold trap as claimed in claim 9 which comprises at least two radiation shields in said housing positioned between said cylindrical body and said reservoir in said housing without either of said radiation shields touching said housing and said reservoir.

12. A vacuum cold trap as claimed in claim 10 wherein said radiation shield is supported by sharp pointed screws insulated from said radiation shield without said radiation shield touching said reservoir and said housing.

13. A vacuum cold trap as claimed in claim 11 wherein one of said radiation shields is supported by thin wires without either of said radiation shields touching said housing and said reservoir.

References Cited by the Examiner

UNITED STATES PATENTS

| | | |
|---|---|---|
| 640,475 | 1/00 | Lanphear. |
| 2,317,814 | 4/43 | Schuchmann et al. |
| 2,513,114 | 6/50 | Smith. |
| 2,514,894 | 7/50 | Naab. |
| 2,519,028 | 8/50 | Dodge. |
| 2,565,722 | 8/51 | Dawley et al. |
| 2,753,954 | 7/56 | Tinker. |
| 2,864,203 | 12/58 | Long. |
| 2,985,356 | 5/61 | Beecher _____ 230—69 |
| 3,081,068 | 3/63 | Milleron _____ 55—269 X |
| 3,137,551 | 6/64 | Mark _____ 55—269 |

OTHER REFERENCES

Milleron, N.: Some Component Designs Permitting Ultra-High Vacuum With Large Oil Diffusion Pumps, in 1958 Vacuum Symposium Transactions, ed. by W. G. Matheson, N.Y. Pergamon Press, American Vacuum Society, Inc., 1959, p. 140–143:QC 166 N3.

REUBEN FRIEDMAN, *Primary Examiner.*

HERBERT L. MARTIN, WESLEY COLE, *Examiners.*